United States Patent
Hummel et al.

(10) Patent No.: US 9,249,717 B2
(45) Date of Patent: Feb. 2, 2016

(54) SUCTION PIPE ASSEMBLY OF AN INTERNAL COMBUSTION ENGINE HAVING A COOLING FLUID INTERCOOLER

(71) Applicant: MANN+HUMMEL GMBH, Ludwigsburg (DE)

(72) Inventors: Karl-Ernst Hummel, Bietigheim-Bissingen (DE); Ulrich Dehnen, Kornwestheim (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 14/334,778

(22) Filed: Jul. 18, 2014

(65) Prior Publication Data
US 2014/0326222 A1    Nov. 6, 2014

Related U.S. Application Data

(63) Continuation of application No. PCT/EP2012/072476, filed on Nov. 13, 2012.

(30) Foreign Application Priority Data

Jan. 19, 2012    (DE) .................. 10 2012 000 875

(51) Int. Cl.
*F02M 15/00* (2006.01)
*F02B 29/04* (2006.01)
*F02M 35/10* (2006.01)

(52) U.S. Cl.
CPC ......... *F02B 29/0443* (2013.01); *F02B 29/0475* (2013.01); *F02M 35/10268* (2013.01); *Y02T 10/146* (2013.01)

(58) Field of Classification Search
CPC ............. F02B 29/0443; F02B 29/0475; F02B 29/0493; F02B 29/0462; F01P 2060/02
USPC .......................................................... 123/542
See application file for complete search history.

(56) References Cited

U.S. PATENT DOCUMENTS

| 4,586,566 A | 5/1986 | Kern et al. |
| 4,823,868 A * | 4/1989 | Neebel .......................... 165/178 |
| 2009/0266041 A1* | 10/2009 | Schrage et al. .................. 55/498 |
| 2011/0088663 A1 | 4/2011 | Dehnen et al. |
| 2012/0061053 A1 | 3/2012 | Geskes et al. |

FOREIGN PATENT DOCUMENTS

| DE | 102007030464 A1 | 1/2009 |
| GB | 1601429 A | 10/1981 |

* cited by examiner

*Primary Examiner* — Lindsay Low
*Assistant Examiner* — Charles Brauch
(74) *Attorney, Agent, or Firm* — James Hasselbeck

(57) ABSTRACT

A suction pipe assembly of an internal combustion engine has a suction pipe and a cooling fluid intercooler arranged in the suction pipe. A seal chamber is provided that is delimited by at least one section of the suction pipe and at least one section connected with the cooling fluid intercooler. A seal, disposed in the seal chamber, seals the suction pipe relative to the cooling fluid intercooler. The seal is made of an initially flowable sealing material introduced into the seal chamber in an initially flowable state and subsequently cured in a curing phase in the seal chamber. The seal chamber is seal-tightly closed with the exception of at least one fill opening through which the sealing material is introduced into the seal chamber.

7 Claims, 6 Drawing Sheets

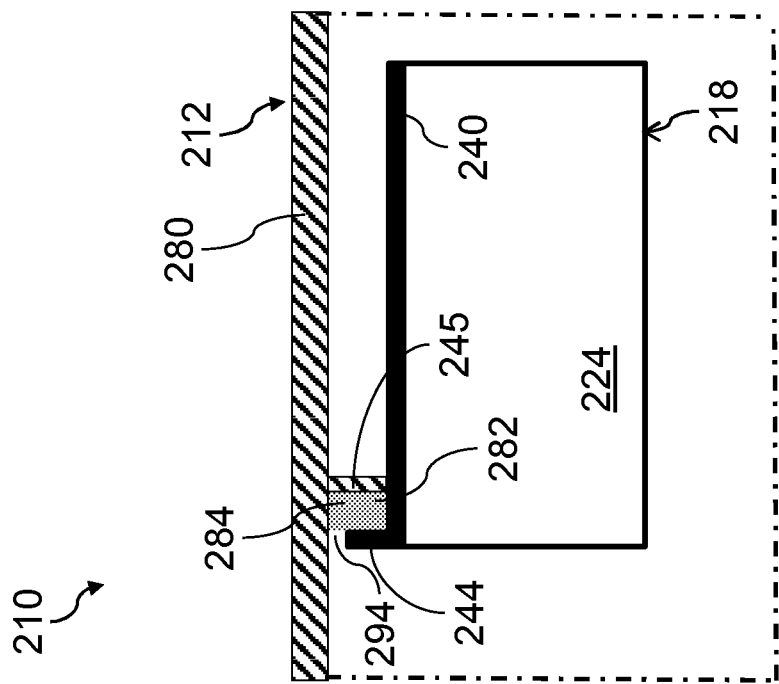
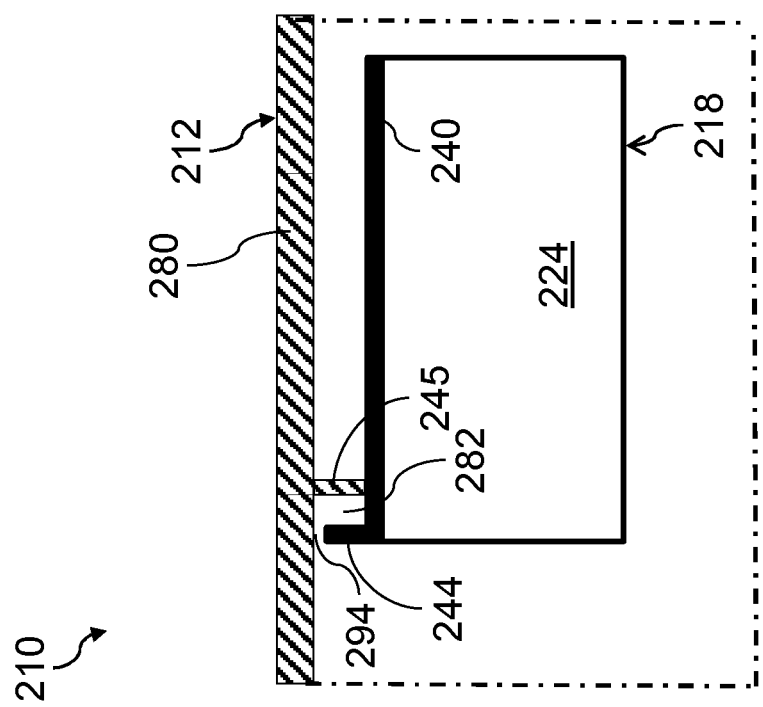

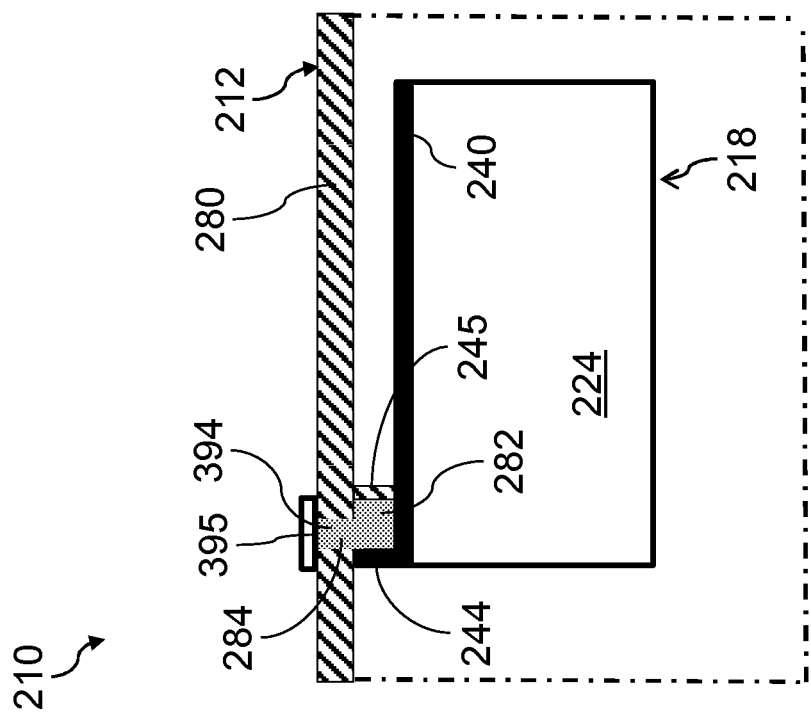
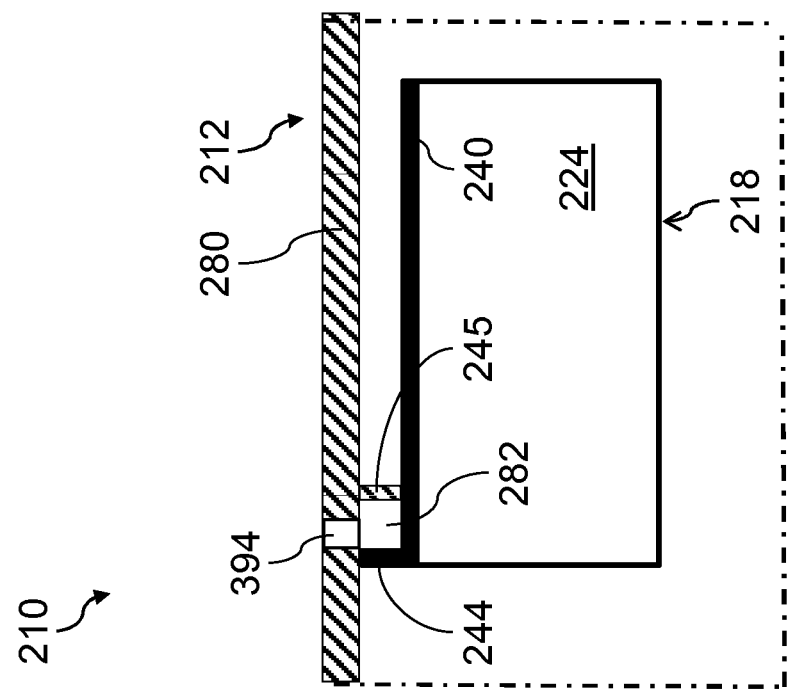

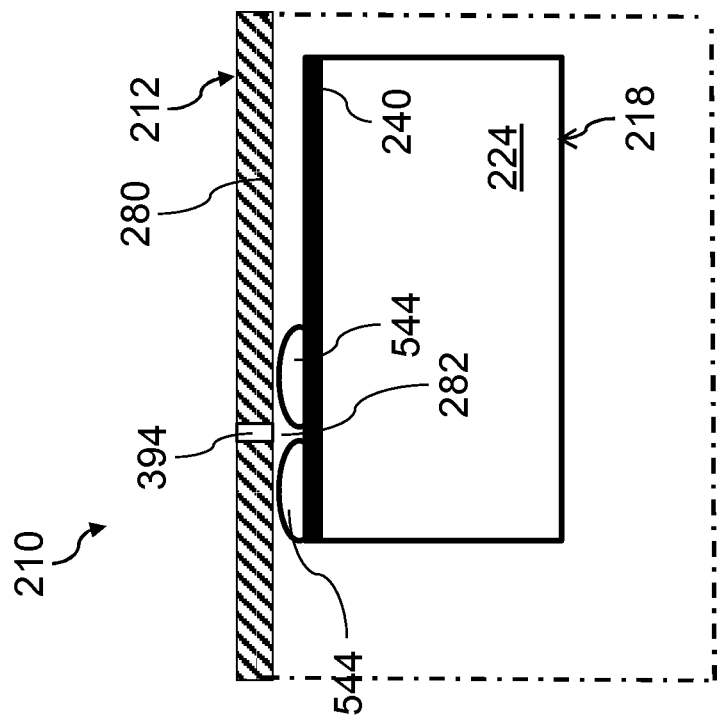
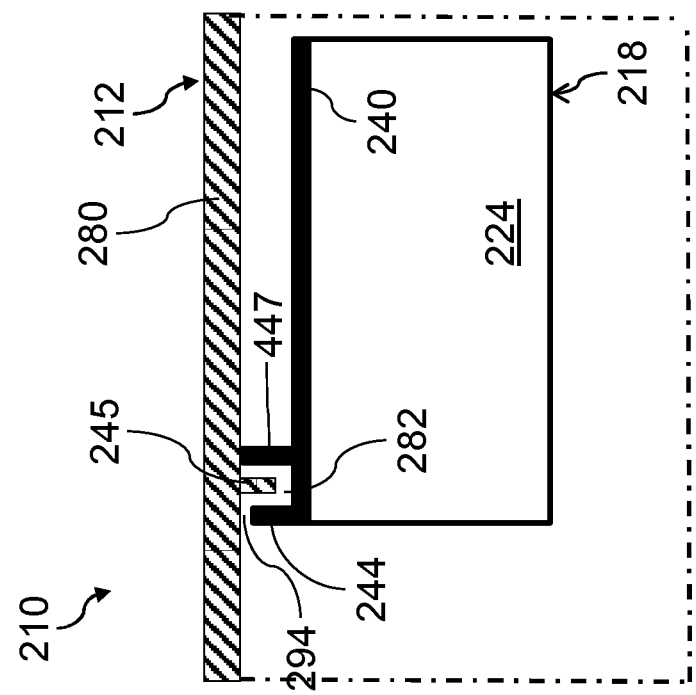

SUCTION PIPE ASSEMBLY OF AN INTERNAL COMBUSTION ENGINE HAVING A COOLING FLUID INTERCOOLER

CROSS-REFERENCE TO RELATED APPLICATIONS

This application is a continuation application of international application No. PCT/EP2012/072476 having an international filing date of 13 Nov. 2012 and designating the United States, the International Application claiming a priority date of 19 Jan. 2012, based on prior filed German patent application No. 10 2012 000 875.9, the entire contents of the aforesaid international application and the aforesaid German patent application being incorporated herein by reference.

BACKGROUND OF THE INVENTION

The invention concerns a suction pipe assembly of an internal combustion engine, in particular of a motor vehicle, comprising a cooling fluid intercooler arranged in the suction pipe and a seal that seals the suction pipe relative to the cooling fluid intercooler.

DE 10 2009 050 258 B3 discloses a suction pipe of an internal combustion engine, in particular of a motor vehicle, in which a water intercooler is arranged. The water intercooler has a connecting water tank and a deflection water tank which are arranged at opposite ends of the water intercooler. The connecting water tank forms partially the suction pipe. An exterior wall of the deflection water tank is formed by a sidewall of the suction pipe housing. An end plate of the water intercooler on the side of the deflection water tank is bent at its rim areas and is pushed onto oppositely positioned sidewalls of the deflection water tank that are extending toward the heat exchanger. The sidewalls delimit laterally a deflection chamber of the deflection water tank. A cooling medium seal is provided between the bent rim areas of the end plate and the sidewalls of the deflection chamber.

The invention has the object to design a suction pipe of the aforementioned kind in which the sealing effect of the seal can be further improved. In particular, the seal should be realizable in a simple way.

SUMMARY OF THE INVENTION

This object is solved according to the invention in that the seal is made of a sealing material that, for introduction into a seal chamber, is initially flowable and subsequently curable, the seal chamber delimited by at least one section of the suction pipe and at least one section connected with the cooling fluid intercooler, and the seal chamber is seal-tightly closed with the exception of at least one fill opening for the flowable sealing material.

According to the invention, a flowable sealing material is thus provided which, for realizing the seal, is introduced via at least one fill opening into the seal chamber. The seal chamber is located in an area between the suction pipe and the cooling fluid intercooler. Heat exchanger networks or similar heat exchanger devices but also cooling fluid tanks, which are used for connecting cooling medium lines or for deflection of a cooling medium flow, are considered part of the cooling fluid intercooler.

The at least one section can be monolithically connected with the cooling fluid intercooler. It can also be attached as a separate component to the cooling fluid intercooler. The seal tightness of the seal chamber for introducing the sealing material can be advantageously just about so large that the initially flowable sealing material is retained therein.

The seal chamber can advantageously have leakage sites or openings that are so small that they are permeable only for substances, in particular gases, that are more flowable than the flowable sealing material. Through these openings or leakage sites, gas that is contained possibly in the seal chamber can escape when introducing the flowable sealing material. Sealing of these openings or leakage sites is realized through the sealing material that will cure later on. The flowable sealing material adjusts to the shape of the seal chamber so that the later cured seal is resting seal-tightly on the boundaries of the seal chamber. Accordingly, even component-related and/or mounting-related tolerances between the sections of the suction pipe and of the cooling fluid intercooler delimiting the seal chamber can be simply compensated. The initially flowable sealing material fills even smallest areas of the seal chamber.

Advantageously, the sealing material can remain elastic after curing. In this way, movements between the suction pipe and the cooling fluid intercooler and/or deformations of the sections which delimit the seal chamber can be compensated without the sealing effect of the sealing device being impaired in this way. Such movements or deformations can be caused by vibrations, temperature fluctuations and/or pressure differences between the interior of the suction pipe and the environment, in particular an increase of the inner pressure.

Advantageously, the sealing material can adhere to the sections of the cooling fluid intercooler and of the suction pipe that delimit the seal chamber. In this way, deformations of the suction pipe housing and/or of the cooling fluid intercooler and relative movements can be even better compensated. Advantageously, the injected seal can also be effectively used when the suction pipe and the section of the cooling fluid intercooler that is resting on the suction pipe are made of different materials. Different materials can have different thermal expansions. Since the seal chamber is filled completely and without a gap with the sealing material, it is not required to press the corresponding sealing sections of the suction pipe and of the cooling fluid intercooler additionally against each other or against the seal. An additional pressing action may be required in contrast thereto in pre-manufactured seals of the prior art in order to achieve a satisfactory sealing action between the seal and the appropriate sealing surfaces of the suction pipe and of the cooling fluid intercooler.

A uniform distribution of the flowable sealing material simplifies fitting of the seal into the seal chamber. Positioning and alignment of the seal in the seal chamber, as is the case in the pre-manufactured seal of the prior art, is not required for the seal according to the invention. The initially flowable sealing material can be distributed even in complexly shaped, in particular labyrinth-type, seal chambers so that even complexly shaped seal sections can be realized in a simple way. In this way, as a whole the shape of the suction pipe and/or the shape of the cooling fluid intercooler can be more freely designed. Due to the greater design freedom of the seal, different shapes of the suction pipe and of the cooling fluid intercooler in the area of the seal can be matched to each other. In this way, the seal can fulfill additionally an adapter function.

Moreover, with the seal that is individually injected into the seal chamber even comparatively small seal chambers or small area within the seal chamber can be sealed. Accordingly, in case of filigree seals the manufacturing expenditure relative to conventional pre-manufactured seals can be reduced. Advantageously, the cast or injected seal can be realized as a disposable seal which upon dismantling the cooling fluid intercooler is automatically destroyed. In this way, it can be prevented that a used seal, which can have a reduced sealing action or can be damaged, can be used several times. In this way, the reliability of the suction pipe and of the cooling fluid intercooler is improved. Advantageously, a housing of the suction pipe can be made of plastic material. A section of the cooling fluid intercooler which delimits the seal chamber can advantageously be made of metal.

In an advantageous embodiment, the seal can be made of a sealing material that will foam at the latest during its curing phase. The sealing action can be improved due to the foaming action of the sealing material. Accordingly, the elasticity of the seal can also be in increased. Due to the foaming action, the seal can moreover be loaded with a kind of mechanical elastic pretension which can further improve the sealing action. Possible tolerances and/or movements between the suction pipe and the cooling fluid intercooler can thus be compensated even better. An adapter function of the seal for compensation of different shapes of the suction pipe and of the cooling fluid intercooler can therefore be further improved.

In a further advantageous embodiment, the at least one fill opening for introducing the sealing material can be accessible from the exterior of the suction pipe. Accordingly, the initially flowable sealing material can be introduced from the exterior into the seal chamber after assembly of the cooling fluid intercooler. This has the advantage that the components during assembly can first be positioned in their final position without having to pay attention to a seal in this context. The introduction of the flowable sealing material can be done after the fixation of the components. Advantageously, the fill opening can be closed off after introducing the sealing material. For this purpose, in particular a cover can be mounted. The cover can be advantageously welded or glued on. In this way, the cover can be sealed in a simple way. However, more than one fill opening can be provided that are accessible from the exterior. In this way, the seal chamber can be filled more uniformly and completely with the sealing material. In this way, even complexly shaped and relatively far reaching seal chambers can be filled in a simple and complete way with the sealing material.

Advantageously, the seal chamber can be delimited at least partially by at least one lateral part and/or a section of the cooling fluid intercooler connected to a cooling medium tank and/or a wall of the suction pipe. In this way, components that are present anyway can be used so that the assembly expenditure and the component expenditure can be reduced.

In a further advantageous embodiment, on the cooling fluid intercooler at least one web, in particular a connecting frame for connecting with the suction pipe, can be arranged which delimits the seal chamber at least partially. The web can be connected monolithically to a part of the cooling fluid intercooler and can thus be part of the cooling fluid intercooler. The web can also be fixedly connected as a separate component with a part of the cooling fluid intercooler and can thus be part of the cooling fluid intercooler. A web can delimit the seal chamber in a simple way. The web can be arranged in particular where no appropriate boundary section is existing at the suction pipe and at the cooling fluid intercooler. With a connecting frame the cooling fluid intercooler can be connected simply and stably with the suction pipe. Advantageously, the connecting frame can be projecting past the exterior sides of heat exchanger networks and/or of cooling medium tanks of the cooling fluid intercooler so that it can be connected simpler with the suction pipe. Advantageously, the web, in particular the connecting frame, can be made of sheet metal. Sheet metal can be changed simply with respect to its shape, in particular bent. Moreover, a stable web, in particular a stable connecting frame, can be realized with sheet metal.

In a further advantageous embodiment, the suction pipe can be combined of at least two suction pipe housing parts and the seal can be arranged between the two suction pipe housing parts. In this way, the seal can serve, in addition to sealing relative to the cooling fluid intercooler, also for sealing a connecting area of the two suction pipe housing parts. Accordingly, an additional separate seal is not required. Advantageously, the section of the cooling fluid intercooler which delimits the seal chamber partially, can be arranged between the two suction pipe housing parts. Accordingly, with the sealing section of the cooling fluid intercooler a stable attachment of the cooling fluid intercooler in the suction pipe housing can be realized additionally in a simple way. Advantageously, a connecting frame of the cooling fluid intercooler can be designed such that it can be mounted simply between the two suction pipe housing parts and, together with the two suction pipe housing parts, can delimit the seal chamber seal-tightly for the initially flowable sealing material.

BRIEF DESCRIPTION OF THE DRAWINGS

Further advantages, features, and details of the invention result from the following description in which embodiments of the invention will be explained in more detail with the aid of the drawing. A person of skill in the art will consider the features disclosed in combination in the drawing, the description, and the claims also expediently individually and combine them to other meaningful combinations.

FIG. 3 shows a section of a suction pipe with a water intercooler according to a third embodiment before introducing a foamed seal.

FIG. 4 shows the suction pipe of FIG. 3 with the seal.

FIG. 5 shows a section of a suction pipe according to a fourth embodiment which is similar to the suction pipe of FIGS. 3 and 4, before introducing the foamed seal.

FIG. 6 shows the suction pipe of FIG. 5 with the seal.

FIG. 7 shows a section of a suction pipe according to a fifth embodiment which is similar to the suction pipes of the FIGS. 3 to 6, before introducing the seal.

FIG. 8 shows a section of a suction pipe according to a sixth embodiment which is similar to the suction pipes of the FIGS. 3 to 7, before introducing the seal.

In the Figures, same components are identified with same reference characters.

DESCRIPTION OF PREFERRED EMBODIMENTS

Figure 1:
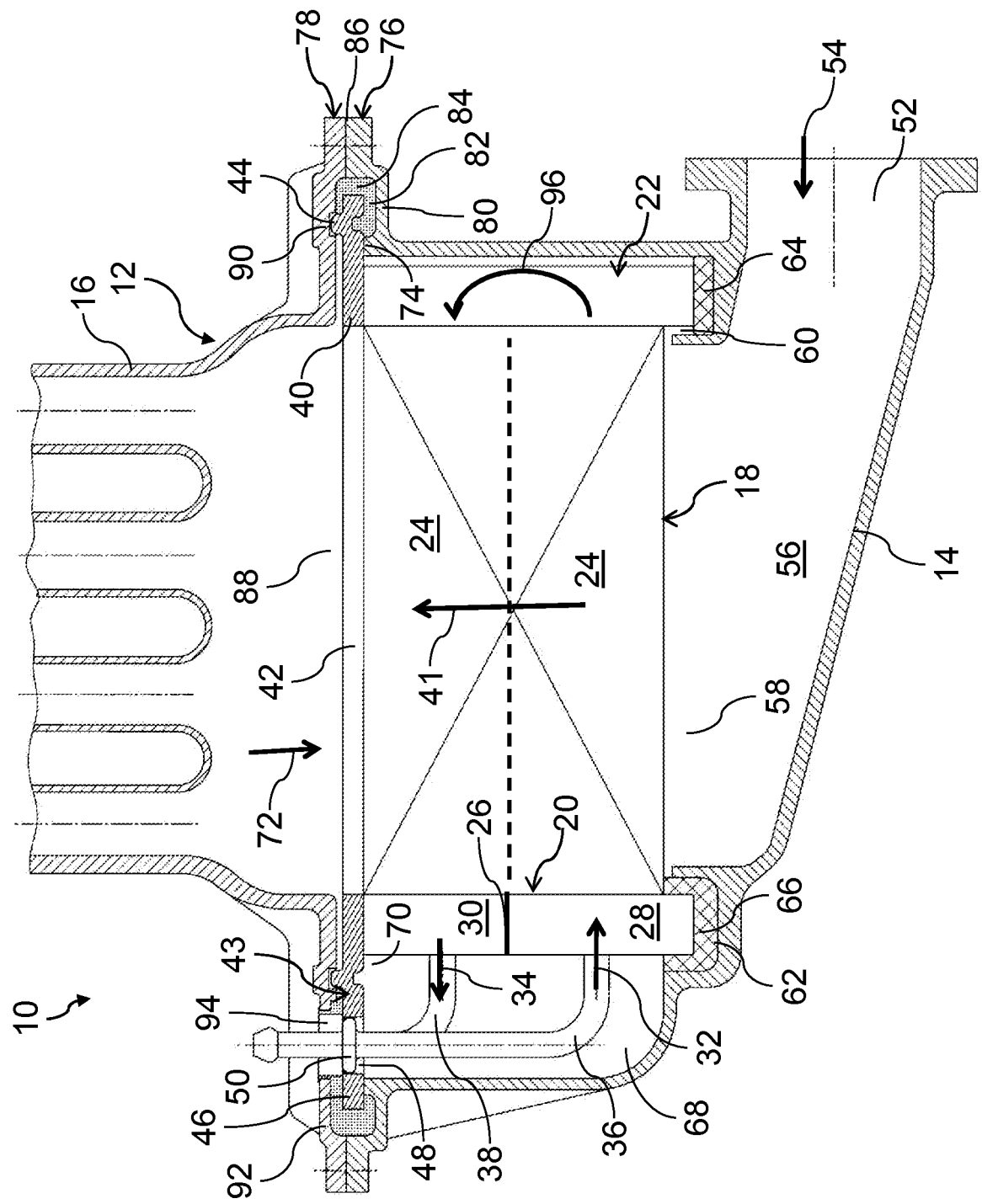
FIG. 1 shows a section of a suction pipe of an internal combustion engine with a water intercooler and with a foamed seal according to a first embodiment.

In FIG. 1, a first embodiment of a suction pipe 10 for intake air of an internal combustion engine of a motor vehicle is illustrated. The suction pipe 10 comprises a suction pipe housing 12. The suction pipe housing 12 has an intake housing part 14, in FIG. 1 at the bottom, and a distributor housing part 16, in FIG. 1 at the top. The intake housing part 14 and the distributor housing part 16 are made of plastic material.

In the suction pipe 10 a water intercooler 18 is arranged. The water intercooler 18 has at opposite ends a connecting water tank 20 and a deflection water tank 22 that are both made of plastic material. The connecting water tank 20 and the deflection water tank 22 are each approximately parallelepipedal. The connecting water tank 20 and the deflection water tank 22 belong to the water intercooler 18. They are preferably integral components of the water intercooler 18.

Two heat exchanger networks 24 of the water intercooler 18 that, as a whole, are approximately parallelepipedal and are not of interest in this context are secured between the connecting water tank 20 and the deflection water tank 22. The heat exchanger networks 24 are arranged in the embodiment of FIG. 1 in an exemplary fashion above each other. Alternatively, they can also be arranged, for example, adjacent to each other.

The connecting water tank 20 is divided by means of a partition 26 into an inlet chamber 28 and an outlet chamber 30. The inlet chamber 28 is arranged at a cooling water inlet side of the heat exchanger network 24 that, relative to a flow direction of the cooling water, is forwardly positioned; in FIG. 1 at the bottom. The outlet chamber 30 is arranged at a cooling water outlet side of the heat exchanger network 24 that, in flow direction of the cooling water, is rearwardly positioned; in FIG. 1 at the bottom.

The inlet chamber 28 has openings, not illustrated in FIG. 1, relative to the heat exchanger network 24, at the bottom in FIG. 1, through which cooling water can pass from the inlet chamber 28 into the heat exchanger network 24. The flow direction of the cooling water in the inlet chamber 28 is indicated in FIG. 1 by arrow 32. The outer chamber 30 has openings relative to the upper heat exchanger network 24, in FIG. 1 at the top, through which cooling water can pass from the heat exchanger network 24 into the outlet chamber 30. The flow direction of the cooling water out of the outlet chamber 30 is in indicated in FIG. 1 by arrow 34.

At the connecting water tank 20 an inlet pipe 36 is arranged which opens into the inlet chamber 28. Through the inlet pipe 36 cooling water can be supplied to the water intercooler 18. The inlet pipe 36 is connected with a cooling water circuit of the internal combustion engine, the cooling water circuit not shown in detail. The cooling water circuit can be the central cooling water circuit of the internal combustion engine. However, it can also be a separate cooling water circuit which is designed specifically for cooling the intake air. The cooling water circuit can however also be connected in any suitable way with the central cooling water circuit of the internal combustion engine. A discharge pipe 38 for discharging the cooling water out of the water intercooler 18 extends away from the outlet chamber 30. The discharge pipe 38 is connected with the cooling water circuit of the internal combustion engine. The inlet pipe 36 and the discharge pipe 38 each have a 90 degree bend and extend through the distributor housing 16, in FIG. 1 at the top, out of the suction pipe housing 12. In FIG. 1, a part of the discharge pipe 38 is hidden by the inlet pipe 36.

The water intercooler 18 has moreover a substantially planar connecting plate 40 of sheet metal. The connecting plate 40 is located at the side which is facing the distributor housing 16. The connecting plate 40 is thus arranged at an air exit side of the heat exchanger network 24, in FIG. 1 at the top, which relative to the cooling water flow is rearwardly positioned. An air flow through the heat exchanger network 24 is indicated in FIG. 1 by arrow 41. The connecting plate 40 is connected fixedly with the connecting water tank 20 and the deflection water tank 22, respectively. The connecting plate 40 has an air opening 42 in the area between the connecting water tank 20 and the deflection water tank 22. The air opening 42 is aligned with an air exit area at the air exit side of the rearward heat exchanger network 24. The intake air which is passing through the heat exchanger network 24 can thus flow unhindered through the air opening 42.

The connecting plate 40 projects with a fastening section 43 past the connecting water tank 20, the deflection water tank 22 as well as the heat exchanger network 24, relative to arrow 41 in radial direction outwardly. In the fastening section 43 a circumferential web 44 is provided. On the side of the connecting plate 40 which is opposite the web 44 there is a matching recess. The web 44 can be realized by stamping or embossing, for example. On the side which is adjacent to the connecting water tank 20, the connecting plate 40 has a section 46 that projects relative to the air opening 42 in radial direction. In the section 46 there are two openings 48 for the inlet pipe 36 and the discharge pipe 38. In the openings 48, there is an annular seal collar 50 which seals the inlet pipe 36 or the discharge pipe 38 in the respective opening 48.

The intake housing part 14 comprises an air inlet socket 52 for the intake air which is located at the side that is opposite the distributor housing 16, in FIG. 1 at the bottom. The flow of the intake air into the inlet socket 52 is indicated in FIG. 1 by arrow 54. The inlet socket 52 extends into an air inlet socket chamber 56 which is connected by means of an air inlet opening 58 with an air inlet side of the heat exchanger network 24 that, in flow direction of the cooling water, is forwardly positioned, in FIG. 1 at the bottom.

On opposite sides of the air inlet opening 58, the intake housing part 14 has a first bearing groove 64 for the deflection water tank 22 and a second bearing groove 62 for the connecting water tank 20. The spacing between the bearing grooves 60 and 62 corresponds to the spacing between the connector water tank 20 and the deflection water tank 22. In the first bearing grooves 60, a plate-shaped rubber bearing 64 is arranged on which the deflection water tank 22 is loosely supported, i.e., is slidable relative to arrow 41 in radial direction within the limits of the first bearing groove 60. In the second bearing groove 62, a rubber bearing 66 with a U-shaped profile is arranged in which the outlet water tank 20 on the side opposite the connecting plate 40 is fixedly supported, i.e., relative to arrow 41 is slidable radially and axially only in the range of elasticity of the rubber bearing 66. In this context, the U-shaped rubber bearing 66 engages the rim of the connecting water tank 20. The bearing grooves 60 and 62 and the bearings 64 and 68 extend each in a U-shape along the three free sides of the connecting water tank 20 and the deflecting water tank 22. The legs of the U-shaped rubber bearings 64 and 66 point to the respective sides of the connecting water tank 20 and of the deflection water tank 22 that are connected with the connecting plate 40. The legs of the U-shaped rubber bearings 64 and 66 extend up to the connecting plate 40.

On the side of the connecting water tank 20 which is facing away from the deflection water tank 22, the intake housing part 14 is expanded to a connecting chamber 68. In the connecting chamber 68, the inlet pipe 36 and the discharge pipe 38 are disposed.

On its side facing the distributor housing 16, the intake housing part 14 has a mounting opening 70 through which the water intercooler 18, in an installation direction which is indicated in FIG. 1 by an arrow 72, can be installed in the intake housing part 14. The mounting opening 70 is surrounded by a support rim 74 on which the connecting plate 40 of the water intercooler 18 is resting. Relative to arrow 41, the support rim 74 is surrounded radially outwardly by an intake-associated connecting flange 76 which serves for connecting to a distributor-associated connecting flange 78 of the distributor housing 16. The connecting flange 76 is formed radially outside of the support rim 74 to an intake-associated, circumferentially closed chamber boundary 80 for a seal chamber 82. The chamber boundary 80 has an approximately U-shaped profile. In the seal chamber 82 a seal 84 of a foamed sealing material is arranged. The intake-associated boundary 80 is surrounded by a circumferentially closed contact surface 86 for an appropriate contact surface of the distributor-associated connecting flange 78.

The distributor housing 16 has on the side facing the intake housing part 14 an air exit opening 88. The air exit opening 88 extends across the air exit side of the heat exchanger network 24, at the top in FIG. 1, and the air opening 42 of the connecting plate 40. The air exit opening 88 is surrounded in a closed configuration by the distributor-side connecting flange 78.

The distributor-associated connecting flange 78 comprises on its side that is facing the connecting flange 76 a circumferentially extending recess 90. When the suction pipe housing 12 is assembled, the web 44 of the connecting plate 40 is immersed in this recess 90. The connecting plate 40 with the web 44 forms a further chamber boundary for the seal chamber 82. The radial outer rim of the connecting plate 40 relative to arrow 41 projects into the seal chamber 82.

Radially outside of the recess 90 the connecting flange 78 is shaped to a connecting-side chamber boundary 92 of the seal chamber 82. The chamber boundary 92 is approximately U-shaped in profile. Radially outside of the chamber boundary 92 there is a distributor-associated contact surface for the contact surface 86 of the intake-associated connecting flange 76.

On the side that is facing the connecting water tank 20, the distributor-associated connecting flange 78 has two openings 94 through which the inlet pipe 36 and the discharge pipe 38 extend. The openings 94 are open toward the seal chamber 82. They are accessible from the exterior of the suction pipe 10. The openings 94 serve thus additionally as fill openings for the flowable sealing material of the seal 84. The seal chamber 82 is otherwise seal-tightly closed with the exception of the openings 94 for the initially flowable sealing material for introducing the seal 84. The seal chamber 82 can however have leakage sites or openings that are seal-tight for the flowable sealing material but are permeable, for example, for air. Accordingly, when introducing the sealing material in the initially flowable state, the air that is contained in the seal chamber 82 can escape. The sealing material, on the other hand, is retained in the seal chamber 82.

The seal 84 seals, on the one hand, the connection of the intake-associated connecting flange 76 with the distributor-associated connecting flange 78 so that the suction pipe housing 12 is sealed at the connecting location in outward direction. Also, the seal 84 seals the water intercooler 18 relative to the suction pipe housing 12. In this way, it is prevented that intake air can flow from the air inlet chamber 56 into the distributor housing 16 by bypassing the heat exchanger networks 24.

For producing the suction pipe 10, the intake housing part 14 and the distributor housing part 16 are manufactured as separate parts. The rubber bearings 64 and 66 are installed through the mounting openings 70 into the bearing grooves 60 and 62 of the intake housing part 14. Subsequently, the water intercooler 18, with its side facing away from the connecting plate 40 leading, is inserted in the installation direction 72 through the mounting opening 70 into the intake housing part 14. In this connection, the deflection water tank 22 is supported on the rubber bearing 64 and the connecting water tank 20 is supported on the rubber bearing 66. The connecting plate 40 is then positioned with its radial outer rim on the support rim 74 of the intake housing part 14. Subsequently, the distributor housing part 16 is placed, with the air inlet opening 88 leading, onto the intake-associated connecting flange 76 so that the intake pipe 36 and the discharge pipe 38 project through the corresponding openings 94. In this context, the web 44 is immersed into the recess 90 of the distributor-associated connecting flange 78. The connecting flanges 76 and 78 are then fixedly connected with each other. This can be done, for example, by a screw connection or a clamping connection. Alternatively, the connecting flanges 76 and 78 can also be welded or glued to each other. Subsequently, the initially flowable sealing material is injected through the openings 94 into the seal chamber 82. The sealing material is distributed within the entire seal chamber 82. The sealing material foams so that even smallest gaps between the connecting flanges 76 and 78 relative to each other and relative to the connecting plate 40 will be closed. The sealing material adheres in this context to all boundaries of the seal chamber 82. The sealing material cures to the elastic seal 84. The openings 94 can be closed off after injection of the sealing material, for example, by appropriate closure members.

In operation of the internal combustion engine, the intake air is sucked in, or blown in, the direction of arrow 54 through the air inlet socket 52 of the suction pipe 12 into the air inlet chamber 56. From here, the intake air flows through the air inlet opening 58 to the heat exchanger networks 24 and passes through them in the direction of arrow 41. In doing so, heat exchange between the intake air and the cooling water in the heat exchanger networks 24 occurs. The intake air passes through the air opening 42 of the connecting plate 40 and the air exit opening 88 into the distributor housing part 16. By means of the distributor housing part 16, the intake air is distributed onto the appropriate combustion chambers of the internal combustion engine in a way not of interest in this context.

Also, in operation of the internal combustion engine, the cooling water from the cooling circuit flows through the inlet pipe 36 into the inlet chamber 28 of the connecting water tank 20. From here, the cooling water flows, in a way not of interest in this context, through the air inlet-associated heat exchanger network 24, in FIG. 1 at the bottom, and flows into the deflection water tank 22. In the deflection water tank 22, the cooling water, indicated by arrow 96, is guided to the water inlet openings of the air exit-associated heat exchanger network 24, in FIG. 1 at the top. The cooling water flows also through this heat exchanger network 24 and reaches the outlet chamber 30 of the outlet water tank 20. From here, the cooling water flows, indicated by arrow 34, into the discharge pipe 38. From the discharge pipe 38, the cooling water is directly returned into the cooling water circuit.

Figure 2:
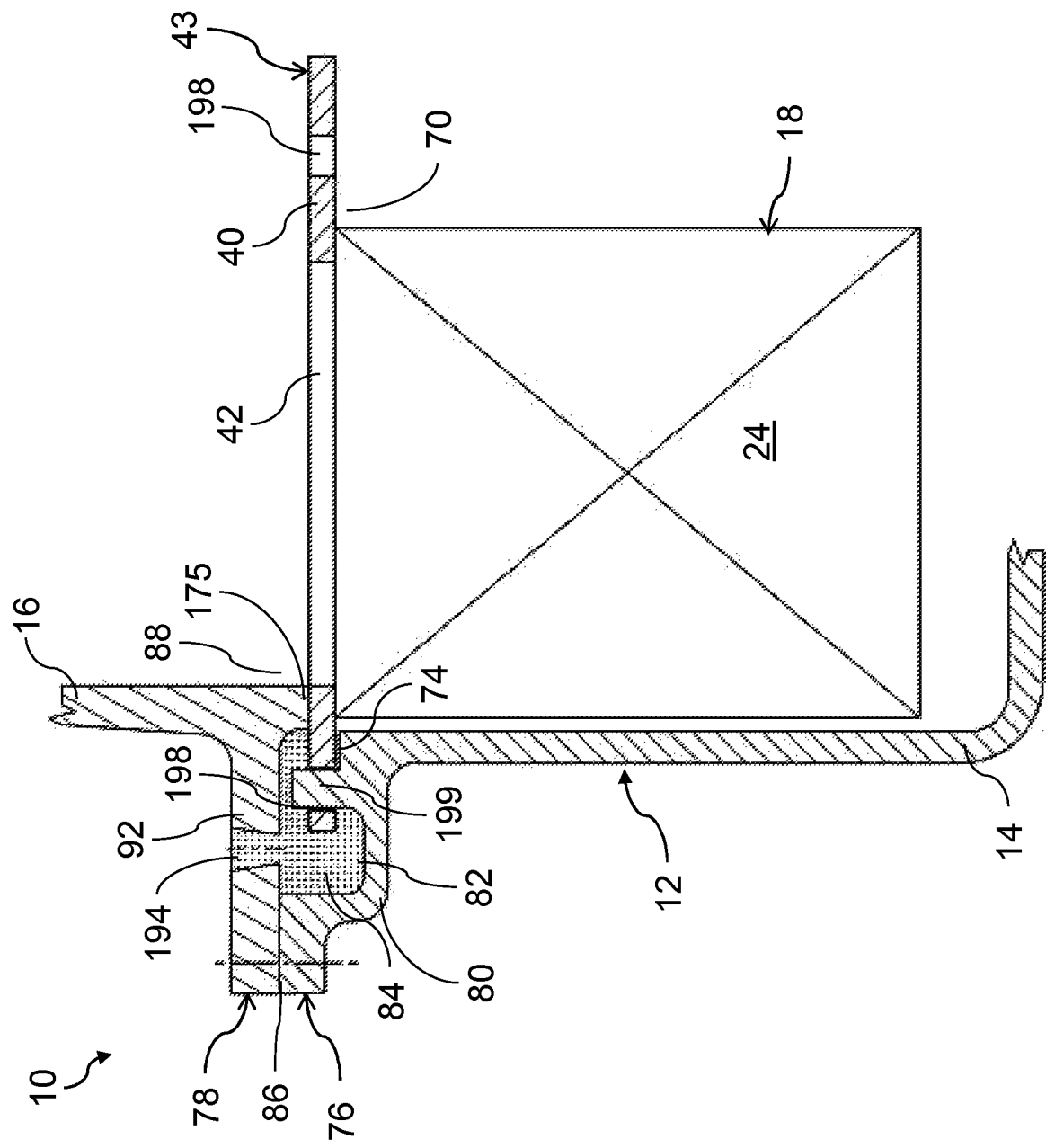
FIG. 2 shows a section of a suction pipe with a water intercooler according to a second embodiment which is similar to the first embodiment of FIG. 1.

In FIG. 2, a detail of the suction pipe 10 according to a second embodiment is shown in section. Those elements that are similar to those of the first embodiment of FIG. 1 are identified with the same reference characters. The second embodiment differs from the first embodiment in that the connecting plate 40 has a plurality of positioning openings 198. The positioning openings 198 are arranged, distributed in circumferential direction, outside of the connecting water tank, the deflection water tank, and the heat exchanger networks 24. The connecting water tank and the deflection water tank are not shown in FIG. 2 as a result of the perspective that is different to that of FIG. 1. Positioning noses 199 of the intake housing part 14 project through the positioning openings 198. For simplifying the illustration, only one side of the intake of the suction pipe housing 12 is shown in FIG. 2. The positioning noses 199 are located outside of the support rim 74 of the intake housing part 14.

Moreover, on the distributor-associated connecting flange 78 a separate fill opening 194 for the initially flowable sealing material of the seal 84 is provided. Web 44 on the connecting plate 40 and the appropriate recesses in the distributor-associated connecting flange 78 are eliminated in the second embodiment. Instead, in the second embodiment the distributor housing 16 has radially within the connecting flange 78 a distributor-associated support rim 175. The distributor-associated support rim 175 is positioned radially within the intake-associated support rim 74 opposite the latter on the side of the connecting plate 40.

Moreover, the distributer-associated chamber boundary 92, in contrast to the first embodiment, is not U-shaped but approximately L-shaped. In the second embodiment, the connecting flange 76 of the distributor housing 16, the connecting flange 78 of the intake housing part 14, and the connecting plate 40 of the water intercooler 18 delimit also the seal chamber 82.

A detail of a suction pipe 210 according to a third embodiment is illustrated in FIGS. 3 and 4 in section. FIG. 3 shows the suction pipe 210 before introduction of the seal 284. In FIG. 4, the suction pipe 210 is shown after introduction of the seal 284. In the third embodiment a seal chamber 282 for the seal 284 is delimited by a lateral part 240, a suction pipe wall 280 of the suction pipe housing 212, a web 244, and a housing-associated web 245. The lateral part 240 can be, for example, a wall of a water tank or a connecting plate of the water intercooler 218. The web 244 can be preferably made of metal. It can also be made of a different type of material, for example, plastic material. The web 244 can be preferably monolithically connected with the lateral part 240. The web 244 can also be a separate part fixedly connected with the lateral part 240 and can be part of it. The housing-associated web 245 can be preferably monolithically connected with the suction pipe wall 280. It can also be fastened as a separate component on the suction pipe wall 280. Between the web 244 and the suction pipe wall 288, there is the fill opening 294 through which the flowable sealing material can be filled in. The seal chamber 282 is seal-tight with the exception of the fill opening 294 for the initially flowable sealing material. As in the two first embodiments, the sealing material foams after having been filled into the seal chamber 282 and cures to the elastic seal 284.

In FIGS. 5 and 6, a detail of a suction pipe 210 according to a fourth embodiment is shown in section. Those elements that are similar to those of the third embodiment of FIGS. 3 and 4 are identified with the same reference characters. The fourth embodiment differs from the third embodiment in that in the suction pipe wall 280 a fill opening 394 for filling in the initially flowable sealing material is arranged. The fill opening 394 is accessible from the exterior of the suction pipe 212. The web 244 extends in the fourth embodiment from the lateral part 240 of the water intercooler 218 to the suction pipe wall 280. In FIG. 6, the suction pipe 210 is shown after having filled in the seal 284. Here, the fill opening 394 after having filled in the sealing material is closed off by a cover 395. The cover 395 is, for example, glued or welded to the suction pipe wall 280. Instead of the cover 395 also a different kind of closure element, for example, a plug can be used.

In FIG. 7, a detail of a suction pipe 210 according to a fifth embodiment is shown in section. Those elements that are similar to those of the third embodiment of FIGS. 3 and 4 are identified with the same reference characters. The fifth embodiment differs from the third embodiment in that a further web 447 is arranged on the side of the housing-associated web 245 which is opposite the web 244 of the water intercooler 218. The second web 447 can be preferably made of metal. It can also be made of a different type of material, for example, of plastic material. The web 447 is attached to the lateral part 240 of the water intercooler 218. Preferably, the web 447 is connected monolithically with the lateral part 240. However, it can also be connected as a separate component fixedly with the lateral part 240. The web 447 extends up to the suction pipe wall 280. The housing-associated web 245 of the suction pipe wall 280 ends instead at a spacing from the lateral part 240. The spacing is so large that the initially flowable sealing material can be distributed through a gap located thereat on both sides of the housing-associated web 245. As a whole, the seal chamber 282 and thus the seal, not shown in FIG. 7, injected therein are of a labyrinth-type configuration. In this way, the sealing action can be improved.

In FIG. 8, a detail of a suction pipe 210 according to a sixth embodiment is shown in section. Those elements that are similar to those of the third embodiment of FIGS. 3 and 4 are identified with the same reference characters. The sixth embodiment differs from the third embodiment in that the web 244 at the lateral part 240 and the housing-associated web 245 on the suction pipe wall 280 are eliminated. Instead, the lateral part 240 of the water intercooler 218 for realizing the seal chamber 282 for the seal, not illustrated in FIG. 8, is corrugated on the side which is facing the suction pipe wall 280. The seal chamber 282 is delimited by a valley between two neighboring peaks 544. A fill opening 349 which is located in the suction pipe wall 280 opens into the seal chamber 282. The fill opening 394 is accessible from the exterior of the suction pipe 210. After introducing the sealing material, the fill opening 394 can be closed off, for example, by a cover.

Figure 9:
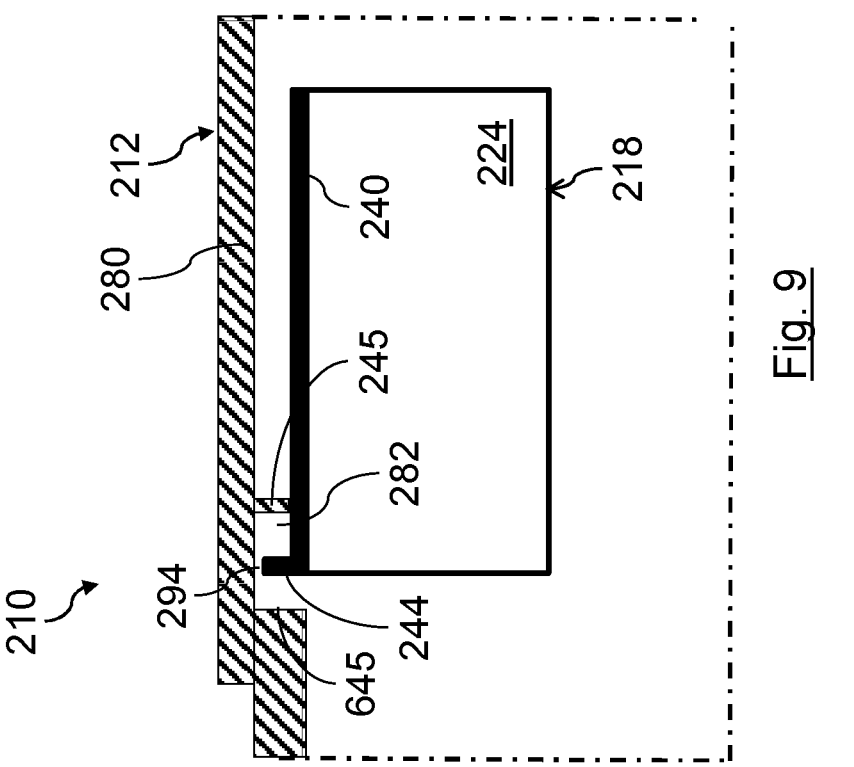
FIG. 9 shows a section of a suction pipe according to a seventh embodiment which is similar to the suction pipes of the FIGS. 3 to 8, before introducing the seal.

In FIG. 9, a section of a suction pipe 210 according to a seventh embodiment is shown in section. Those elements which are similar to those of the third embodiment of FIGS. 3 and 4 are identified with the same reference characters. The seventh embodiment differs from the third embodiment in that the inner side of the suction pipe wall 280 which is facing the water intercooler 218 is provided with a U-shaped groove with one side wall being formed by the web 245. The other side wall 645 of the groove is realized by a cross-sectional constriction of the suction pipe 212. The web 244 of the lateral part 240 of the water intercooler 218 projects into this groove. The seal chamber 282 is delimited by the web 244 and the web 245 and the intermediately positioned sections of the suction pipe wall 280 and of the lateral part 240. The fill opening 294 is located, as in the third embodiment, between the web 244 and the suction pipe wall 280.

Figure 10:
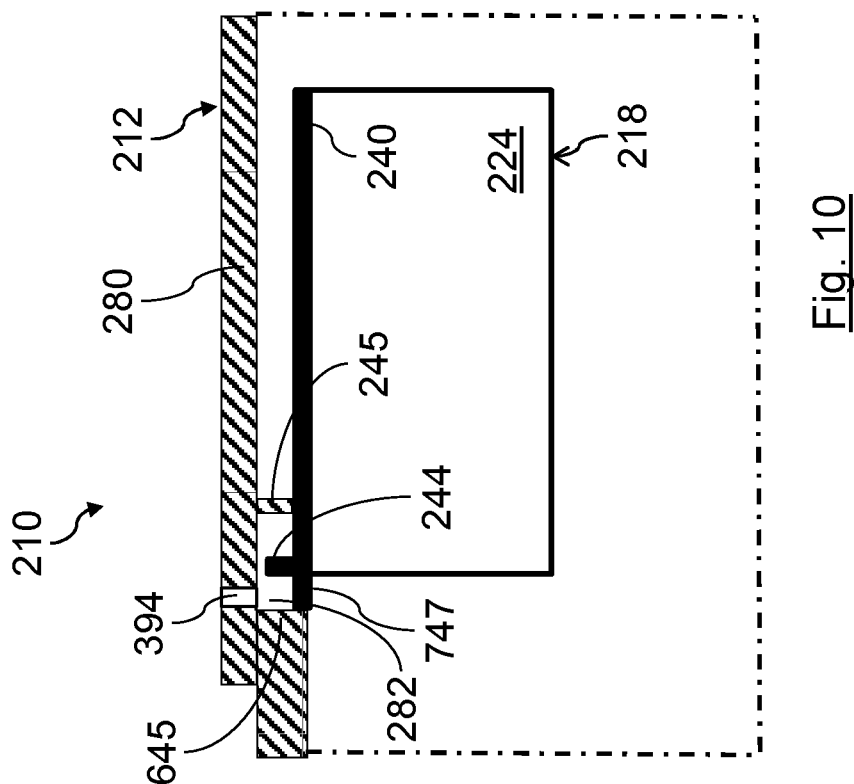
FIG. 10 shows a section of a suction pipe according to an eighth embodiment which is similar to the suction pipes of the FIGS. 3 to 9, before introducing the seal.

In FIG. 10, a section of a suction pipe 210 according to an eighth embodiment is shown in section. Those elements that are similar to those of the seventh embodiment of FIG. 9 are identified with the same reference characters. In contrast to the seventh embodiment, in the eighth embodiment a further web 747 is connected with the lateral part 240. The web 747 can be made preferably of metal. It can however also be made of a different material, for example, of plastic material. Preferably, the web 747 is monolithically connected with the lateral part 240. It can however also be connected as a separate component to the lateral part 240. The web 747 extends approximately orthogonally to the web 244 away from the water intercooler 218. The free rim of the web 747 is resting seal-tightly for the flowable sealing material on the sidewall 645 of the U-shaped groove of the suction pipe wall 280 that is opposite the web 245. The web 747 can thus serve as a stop. A fill opening 394 opens into the seal chamber 282 in the area between the sidewall 645 of the groove and the first web 244. The fill opening 394 is located in the suction pipe wall 280. It is accessible from the exterior of the suction pipe 210. Between the web 244 and the suction pipe wall 280 there is a gap through which the flowable sealing material can flow. In this way, the seal chamber 282 and thus the seal, not illustrated in FIG. 10, are shaped in a labyrinth-like configuration.

In all of the above described embodiments of a suction pipe 10; 210, the following modifications are inter alia possible.

The invention is not limited to a suction pipe 10; 210 of an internal combustion engine of a motor vehicle. Instead, it can be used also in other types of internal combustion engines, for example, in industrial motors.

The suction pipe housing 12; 212, in particular the intake housing 14 and the distributor housing 16, can be made of a different material, for example, of metal, instead of being made of plastic material.

The suction pipe housing 12 can also be comprised of more than two parts. It can also be comprised of a single housing part.

Instead of the water intercooler 18; 218, also a different kind of cooling medium intercooler can be provided which can be flowed through by a different kind, in particular liquid or gaseous, cooling medium instead of cooling water.

In the first embodiment according to FIG. 1, instead of the two heat exchanger networks 24, also fewer or more than two heat exchanger networks can be provided. The heat exchanger networks can also be arranged in a different way.

The connecting water tank 20 and the deflection water tank 22, instead of being made of plastic material, can also be made of a different material.

The connecting water tank 20 and/or the deflection water tank 22, instead of being parallelepipedal, can also be of a different shape, for example, cylinder-shaped.

The connecting plate 40, instead of being made of sheet metal, can also be made of a different material, for example, plastic material.

The web 44, instead of being made by stamping or embossing, can also be realized in a different way. For example, a separate web can also be attached to the connecting plate 40, for example, glued, welded or soldered.

Instead of using a sealing material which cures to the elastic seal 84; 284, also a sealing material can be used which cures to a non-elastic seal.

It is also possible to use sealing material which does not foam after introduction into the seal chamber 82; 282.

While specific embodiments of the invention have been shown and described in detail to illustrate the inventive principles, it will be understood that the invention may be embodied otherwise without departing from such principles.

What is claimed is:

1. A suction pipe assembly of an internal combustion engine, the suction pipe assembly comprising:
   a suction pipe including
      a suction pipe housing having a chamber therein, the suction pipe housing including:
         an first housing part having a first connecting flange circumferentially surrounding the chamber;
         a second housing part having a second connecting flange circumferentially surrounding the chamber;
         wherein the first and second connecting flanges have a contact surface at which the first and second connecting flanges contact each other face to face circumferentially surrounding the chamber when the suction pipe housing is in a closed state;
         wherein a circumferential seal chamber is formed by and between the first connecting flange and the second connecting flange;
   a cooling fluid intercooler arranged in the chamber of the suction pipe housing;
   the seal chamber is delimited by the first connecting flange, the second connecting flange and a connecting plate of the cooling fluid intercooler;
   a seal, disposed in the seal chamber, sealing the suction pipe relative to the cooling fluid intercooler;
   the seal made of an initially flowable sealing material introduced into the seal chamber as a liquid between the first connecting flange and the first housing part and contacting second connecting flange of the second housing part into the circumferential seal chamber in an initially flowable state and subsequently cured in a curing phase in the seal chamber;
   the seal chamber seal-tightly closed with the exception of at least one fill opening extending through the second connecting flange through which the liquid sealing material is introduced into the seal chamber while the first housing part and the second housing part are in the closed state.

2. The suction pipe assembly according to claim 1, wherein the sealing material foams at the latest in the curing phase.

3. The suction pipe assembly according to claim 1, wherein the at least one fill opening for introducing the initially flowable sealing material is accessible from an exterior of the suction pipe.

4. The suction pipe assembly according to claim 1, wherein the at least one first section of the suction pipe is a wall of the suction pipe, and
wherein the at least one second section connected with the cooling fluid intercooler is a lateral part of the cooling fluid intercooler or a section of the cooling fluid intercooler connected with a cooling medium tank.

5. The suction pipe assembly according to claim 1, wherein the at least second section connected with the cooling fluid intercooler is at least one web.

6. The suction pipe assembly according to claim 1, wherein the at least second section connected with the cooling fluid intercooler is a connecting frame that connects the cooling fluid intercooler to the suction pipe.

7. The suction pipe assembly according to claim 1, wherein the seal is enclosed by and contacts directly against the first connecting flange, the second connecting flange and the connecting plate of the cooling fluid intercooler.

* * * * *